United States Patent Office 2,739,982
Patented Mar. 27, 1956

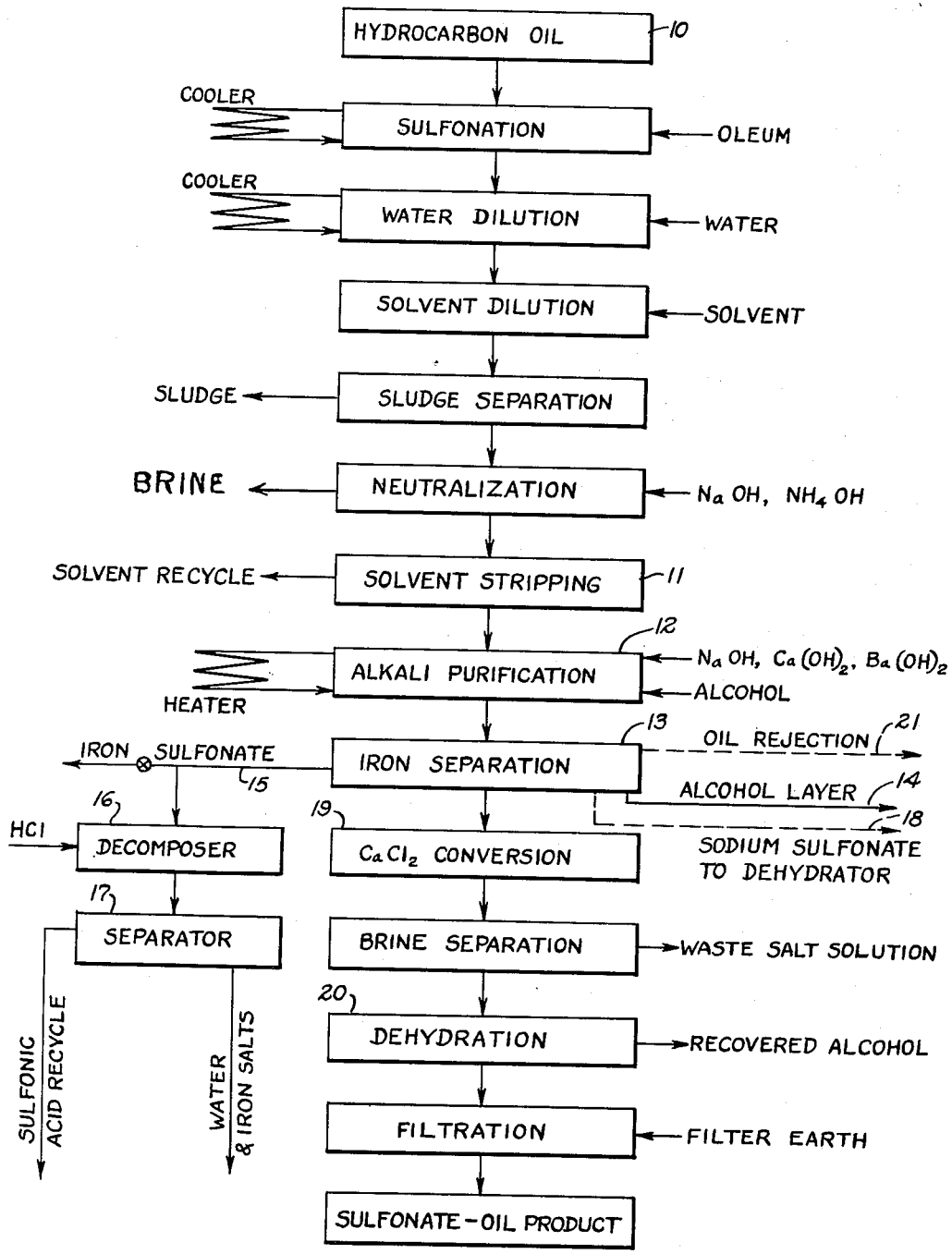

2,739,982
MANUFACTURING HYDROCARBON SULFONATES

Robert B. Roessler, Pasadena, Calif., assignor to Bray Chemical Company, Los Angeles, Calif., a corporation of California Application April 28, 1953, Serial No. 351,622

14 Claims. (Cl. 260—504)

This invention relates to the manufacture of sulfonates and particularly the preferentially oil soluble or "mahogany" sulfonates. Still more particularly, the invention relates to sulfonates of the alkaline earth metals made from the sulfonation of petroleum hydrocarbons with fuming sulfuric acid. The invention is illustrated by a drawing which is a flow diagram of the process.

One object of the invention is the elimination of undesirable sulfonates of non-alkaline metals, particularly iron, which commonly occur in petroleum sulfonates as impurities. Another object of the invention is the preparation of clear alkali metal and alkaline earth metal sulfonates free of cloudy matter caused by contamination with non-alkaline metals. "Non-alkaline" metals are those whose hydroxides are neutral or acid to phenolphthalein indicator.

In the manufacture of mahogany sulfonates, it has been the practice to intimately mix a suitable hydrocarbon oil with fuming sulfuric acid, commonly known as oleum, care being taken to prevent excessive rise in temperature which is destructive of the sulfonic acid produced. After separation of sludge, the oil is neutralized, for example, with lime or caustic soda and the resulting product usually containing from about 5 to 20 percent of sulfonate is dehydrated and clarified by filtration. In the case where caustic soda is used for neutralizing, it is common practice to wash the product with aqueous alcohol, for example, 50 percent methanol, ethanol or isopropanol to remove sodium sulfate, which is tenaciously held in the oil phase, apparently in the form of a colloid peptized by the sulfonate or a co-ordination compound.

In order to facilitate separation of sludge following sulfonation of the oil and thereby improve the yield and quality of the "mahogany" sulfonate product and particularly the color thereof, it has become the practice to dilute the sulfonated oil either before or after sulfonation with a hydrocarbon solvent. Such an operation is shown in the patent to Blumer, U. S. No. 2,396,673. According to this process, an aromatic solvent is added to the "acid oil" immediately after sulfonation and, after settling sludge, the diluted oil is neutralized, washed with water and stripped to remove the solvent and leave the finished product, which may be clarified by filtration. It has been found that the addition of about five (5) to twenty-five (25) percent of water to the acid oil before addition of solvent, based on the weight of acid, serves to facilitate the separation of sludge and prevent sulfonation of the aromatic solvent. Excessive addition of water, however, is undesirable as it causes transfer of colored bodies from the sludge to the oil layer, giving a dark colored product. When the solvent is a non-aromatic naphtha, no danger of sulfonation of the solvent exists, but even in this case, a small amount of water facilitates sludge separation.

I have discovered that sulfonates prepared by this method contain a small amount of iron in the form of iron sulfonates, which adversely affect the product from the standpoint of oxidation stability, color stability and clarity. Traces of iron in the product strongly catalyze oxidation and are particularly undesirable when the product is used as an additive in lubricating oils, where oxidation leads to sludge formation. I have now discovered that the sulfonates of iron, lead, zinc, copper and other non-alkaline metals can be removed from the desired sulfonates of sodium, potassium, lithium, ammonium, calcium and barium by contacting with alkali in alcohol solution. For this purpose, I may conveniently employ a solution of sodium hydroxide in secondary butyl alcohol, but other butyl alcohols as well as methanol, ethanol and isopropanol are also effective. The amount of alkali required is usually only that necessary to bring the alkalinity of the solution into the range of pH 10 to 12, about 0.2 to 2% based on the weight of the neutral oil being sufficient. Conveniently, a 10% aqueous solution of NaOH is used for the purpose.

In place of sodium hydroxide, I may use ammonium hydroxide, potassium hydroxide, calcium hydroxide or barium hydroxide. The reaction proceeds more rapidly when heated and a temperature in the range of 125 to 190° F. is desirable, care being taken to prevent loss of alcohol by evaporation. Introduction of air or oxygen at this point is sometimes desirable to convert ferrous iron to the ferric condition. After thoroughly agitating the mixture of sulfonate, oil and alcoholic alkali, for example, from 15 minutes to one hour, it is allowed to settle and stratify. A salt solution can be added to aid stratification. The iron sulfonate separates from the mixture as an insoluble flocculent precipitate, appearing as a "cuff" or "rag" at the interface between the alcohol layer and the oil-sulfonate layer. This cuff can be drawn off as a slop and processed further for recovery of its sulfonate content, if desired. The purified oil-sulfonate layer is then dehydrated usually by heating to about 300° F. in a still where the dissolved alcohol vapors are recovered. The dehydrated product is usually further clarified by filtration through a suitable filter aid, preferably infusorial earth such as Supercel, Hyflo or Dicalite. The alkalinity of the product can be adjusted by adding acid or alkali before the dehydration step.

Iron enters the sulfonation process by several routes, one being the iron contained in the oleum employed in the process, generally ferric sulfate, and another being the iron salts formed by contact of sulfuric acid with iron apparatus, tanks, pipe lines, etc. Iron is also frequently found in the water used for washing.

To determine if the product is free from iron, a sample, for example ten grams, is diluted with butanol and shaken with an excess of dilute hydrochloric acid, sufficient to decompose the sulfonates into the oil soluble sulfonic acid which remains in the oil phase. The aqueous phase is then tested for iron by the usual ferrocyanide test.

If desired to increase the concentration of sulfonate above that obtained from the sulfonation reaction, this can be done by the process described in the patent application of U. B. Bray, Serial No. 253,529, now Patent No. 2,732,344, wherein oil-sulfonate solution is subjected to the action of water and alcohol to effect rejection of a large part of the oil. For example, half to three-fourths of the oil can be separated as an upper layer. This oil-rejection step may be combined with the alkali purification step hereinbefore described, or it can be carried out before or after the alkali purification.

When it is desirable to convert sodium sulfonate purified in the foregoing manner to calcium sulfonate, it can be accomplished by exchange of calcium for sodium by intimately contacting in alcohol solution with a soluble calcium salt in a manner well known in the art. For example, calcium chloride, calcium nitrate, calcium acetate, etc. can be used for this purpose in water solution of 10 to 30% strength, preferably about 20%. If a large excess of the calcium salt is used, substantially all the sodium sulfonate is converted to the calcium sulfonate. Barium sulfonates can be made in the same manner. After washing the product with water to remove the inorganic salts, the product is dehydrated and clarified by filtration as hereinbefore described.

I have found that where the iron and other non-alkaline metals are entirely removed from the product, it is obtained as a bright, clear liquid, generally of a red color, which on dilution with 95% of petroleum thinner, gives a bright, clear, yellow solution, substantially free of opalescence or cloud. When iron sulfonates are present, however, it is difficult to obtain a clear solution, apparently on account of the separation of basic iron compounds in the finished product. The addition of a small amount, e. g. one-half to five percent of lime or barium hydroxide, as the case may be, before or during the dehydration, produces a basic calcium or barium sulfonate which is particularly desirable for certain uses, for example, for preventing corrosion of metals. The basicity of such a product may be about 5 to 20 milligrams KOH equivalent per gram and it may contain from 25 to 75 percent of oil, depending on the aromaticity of the hydrocarbon stock treated and the degree of concentration.

If it is desired to recover the sulfonates from the rejected iron sulfonate or "rag," this can be effected by decomposing it with acid, preferably hydrochloric acid, or a mixture of sulfuric acid and sodium chloride. The hydrochloric acid, owing to its high vapor pressure, penetrates the oily mass of iron sulfonate and decomposes it into sulfonic acid and iron chloride which, being water soluble, is readily extracted from the material. The presence of alcohol, preferably ethyl, propyl or butyl alcohol, facilitates the separation and prevents emulsion formation. When most of the iron has been washed out of the material in this manner, the sulfonic acid product is conveniently returned to the alkali purification stage of the process, where it is reconverted to sodium sulfonate or other sulfonate corresponding to the neutralizing base used.

The accompanying drawing shows schematically the operation of the process as applied to the manufacture of calcium sulfonate from lubricating oil. The oil may have a viscosity of about 450 to 500 sec. Saybolt at 100° F. and should have been partly refined by a light sulfuric acid treat or solvent extraction. I can also use alkylated aromatics such as polybutyl benzene, higher alkylnapthalenes, etc.

The drawing is largely self-explanatory and shows hydrocarbon oil entering the system at 10, passing through the sulfonation stage, water dilution stage, where the acid concentration is reduced, solvent dilution stage, sludge separation, then neutralization with caustic soda, ammonium hydroxide, etc. Lime or barium hydroxide can also be used for neutralization, but trouble is frequently encountered from emulsions resulting from separation of insoluble calcium and barium sulfates. The solvent, for example, benzene, toluene, xylene or petroleum naphtha is removed in the stripping stage 11 and recycled to the solvent dilution stage. After removal of hydrocarbon solvent, the stock passes to the alkali purification stage 12 where it is treated with alkali in the presence of alcohol. About 15 to 40% of alcohol by volume is sufficient and additional water can be added to reject oil, as will be described hereinafter. It is preferred to use sodium hydroxide or ammonium hydroxide in the purification stage. I may wash the sulfonate with aqueous alcohol solution to remove water soluble sulfates before the alkali purification stage 12, in which case the alkali purification may be effected by the use of lime or barium hydroxide without serious difficulty from calcium and barium sulfate emulsions. The alcohols employed in the purification stage are appreciably water soluble and may include the butyl and amyl alcohols and mixtures thereof.

From the alkali purification stage 12, the product is settled or centrifuged in iron separation stage 13, where the iron or other heavy metal sulfonates are separated as an insoluble slime or "rag" obtained as an interface between the aqueous alcohol layer and the oil-sulfonate layer. The alcohol layer is drawn off at 14 for recovery of alcohol, while the iron sulfonate slop is drawn off at 15 and is either discharged from the system or passed into decomposer 16, where it is treated with hydrochloric acid and separated in 17 into a water soluble iron solution, which is discarded and a sulfonic acid layer which is recycled to a convenient point in the system, preferably to the purification stage previously described. Separation of sulfonic acid in 17 may be facilitated by dilution with a volatile hydrocarbon solvent.

As indicated by the dotted line 18, after the iron separation the product may optionally be dehydrated by heating to about 300 to 350° F. and obtained in the form of the alkali metal or ammonium soap for use as such or for conversion into other sulfonates.

When converting the sulfonate to alkaline earth metal sulfonates, the oil-sulfonate solution passes from the iron separation stage 13 to the conversion stage 19, where it is treated with calcium chloride brine, barium chloride brine or other water soluble salt of alkaline earth metal. The brine treatment is economically carried out in two or more countercurrent stages. The converted oil-sulfonate is then washed with water to remove excess calcium and sodium salts.

In the brine separation stage, the excess calcium chloride and displaced sodium chloride are rejected and the oil-sulfonate solution is passed into the dehydration stage 20, where it is heated in a shell still or pipe still to a temperature of 300 to 350° F. for removal of alcohol and water, the alcohol being condensed and recovered. In the manufacture of calcium and barium sulfonates, it is usually desirable to add calcium or barium hydroxide in the dehydration step to insure the neutrality of the product or produce a basic sulfonate which is particularly desirable when employed in anti-rust oils. The addition of about one to five percent of lime in the dehydration stage when manufacturing calcium sulfonate produces a product having an alkali value of about 5 to 15 mg. KOH equivalent per gram.

Excess lime and other insoluble material in the oil is removed by filtration of the hot product in the filtration stage, preferably in the presence of a suitable filter aid, such as diatomaceous earth. The final product is a clear, red, viscous oil, whose viscosity depends largely on the sulfonate concentration and the alkali value, the basic sulfonates being less viscous than the neutral sulfonates. The drawing does not show the concentration stage hereinbefore referred to. The concentration involves the separation of oil from the oil-sulfonate solution and may be conveniently combined with the alkali purification stage, an oil layer being separated when removing iron in separator 13. Four layers may be obtained by controlling the water and alcohol concentration and temperature—an oil layer on the top, next a layer of oil-sulfonate, alcohol-water solution, a water-alcohol-alkali-salt phase at the bottom, and an iron sulfonate "rag" or slime intermediate between the bottom layer and the sulfonate solution.

For my purpose, it is desirable to separate from about one-fourth to three-fourths of the oil in the oil-sulfonate solution. Oil rejection from the separation stage 13 is indicated by dotted line 21. For many uses, concentration by oil rejection is not needed.

The calcium sulfonate product of my process is a clear, viscous, red oil, having an ash (sulfated) of about 4 to 8%, usually about 5–6%, corresponding to about 30 to 40% of calcium sulfonate. The alkali value is typically about 2 to 6 mg. KOH per gram equivalent.

The color is typically about 1½ to 2½ ASTM. When 5 grams are dissolved in 100 cc. petroleum thinner ("200 thinner"), a clear solution results having only a faint opalescence. Extraction with acid gives a water solution having a negative test for iron, copper and other heavy metals usually present in petroleum sulfonates.

The chemistry of my process is not entirely clear but it is thought that iron contaminants in the raw materials of my process, particularly in the oleum, form sulfonates or double salts with sulfuric and sulfonic acids in the presence of the hydrocarbon solvent which shifts the equilibrium away from the formation of iron sulfate. As a result, the iron contamination goes into the sulfonation products instead of the sludge acid and later appears in the finished products where it gives a cloudy dispersion of ferric oxide or basic ferric sulfonate.

Having thus described my invention, what I claim is:

1. The process of making petroleum sulfonates of the alkali and alkaline earth metals and ammonium, substantially free of iron, which comprises sulfonating a petroleum lubricating oil, diluting the sulfonation product with a normally liquid hydrocarbon solvent, separating the oil phase from acid sludge, neutralizing said oil phase, removing hydrocarbon solvent from the neutralized oil-sulfonate product, contacting said oil-sulfonate solution with about 0.2 to 2% of an alkali in the presence of a lower, saturated aliphatic alcohol, separating an insoluble sludge and recovering oil and sulfonate from the oil phase, from which said sludge has been separated.

2. The process of claim 1, wherein the hydrocarbon solvent employed is an aromatic hydrocarbon distillate selected from the class consisting of benzene, toluene, xylene and aromatic petroleum naphtha.

3. The process of claim 1, wherein said sulfonation product diluted with hydrocarbon solvent is neutralized with sodium hydroxide after separating from acid sludge.

4. The process of claim 3, wherein the oil-sulfonate solution, after stripping free of hydrocarbon solvent, is treated with aqueous sodium hydroxide and butyl alcohol to remove contaminating iron compounds.

5. The process of claim 1, wherein the oil and sulfonate are purified with alcohol and caustic soda and the resulting purified sulfonate is converted to an alkaline earth sulfonate by contacting with a water soluble salt of an alkaline earth metal, substantially free of contaminating iron compounds.

6. The process of making an alkaline earth metal sulfonate substantially free of iron, which comprises sulfonating a petroleum lubricating oil with fuming sulfuric acid containing iron, thereby producing a petroleum sulfonic acid in hydrocarbon oil solution, contaminated with iron sulfonate, diluting the sulfonation product with a normally liquid hydrocarbon solvent, separating the sulfuric acid sludge, neutralizing the diluted sulfonation product comprised of unsulfonated lubricating oil and preferentially oil soluble sulfonic acids, distilling hydrocarbon solvent from the neutralized oil and sulfonate mixture, intimately contacting the oil and sulfonate in a purification step with about 0.2 to 2% of an alkali in the presence of a substantially water soluble lower, saturated aliphatic alcohol, thereby effecting the separation of insoluble sludge containing contaminating iron compounds and recovering purified sulfonate from the alcohol solution from which said iron compounds have been separated.

7. The process of claim 6 wherein said purification step of the process is conducted at about 125 to 190° F.

8. The process of claim 6 wherein the mixture of sulfonate and alkali in said purification step is contacted with air to convert ferrous compounds to ferric compounds.

9. The process of making sulfonates substantially free from iron which comprises sulfonating a petroleum lubricating oil with fuming sulfuric acid containing iron, thereby producing a petroleum sulfonic acid, diluting the sulfonation products with a normally liquid aromatic hydrocarbon solvent, thereby extracting from the acid sludge desired oil soluble sulfonic acids contaminated with oil soluble compounds of iron, separating the acid sludge from the sulfonated oil and hydrocarbon solvent, neutralizing sulfonation products with an alkali metal hydroxide, separating the resulting sulfonic soaps and solvent from brine, distilling hydrocarbon solvent from sulfonated oil, intimately contacting the sulfonated oil with about 0.2 to 2% of additional alkali metal hydroxide in a purification step in the presence of a lower, saturated aliphatic alcohol, thereby forming an alkaline sludge containing insoluble compounds of iron, separating the sulfonated oil from the sludge and recovering alcohol therefrom.

10. The process of claim 9, wherein the purification step is conducted at a temperature of about 125 to 190° F.

11. The process of claim 9, wherein the purification step is carried out in the presence of sufficient oxygen to convert the ferrous compounds to ferric compounds.

12. The process of claim 9, wherein a small amount of water is added to the sulfonation products to dilute the sulfuric acid before mixing with said aromatic hydrocarbon solvent.

13. The process of claim 9, wherein insoluble iron sulfonates separated in said purification step are decomposed with hydrochloric acid and the recovered sulfonic acids are recycled to said purification step of the process.

14. The process of claim 9, wherein purified alkali metal sulfonates are converted into alkaline earth metal sulfonates by contacting with an alkaline earth metal chloride in the presence of sufficient alcohol to prevent emulsification and the resulting alkaline earth metal sulfonate and hydrocarbon oil mixture is dehydrated and filtered to produce a solution of alkaline earth metal sulfonate in oil which is substantially free from iron.

References Cited in the file of this patent

UNITED STATES PATENTS

| | | |
|---|---|---|
| 1,901,383 | Voogt | Mar. 14, 1933 |
| 2,040,673 | Robinson | May 12, 1936 |
| 2,097,440 | Blumer | Nov. 2, 1937 |
| 2,357,866 | Archibald et al. | Sept. 12, 1944 |
| 2,396,673 | Blumer | Mar. 19, 1946 |
| 2,535,784 | Cohen | Dec. 26, 1950 |